US010003733B2

(12) United States Patent
Van Den Herik et al.

(10) Patent No.: US 10,003,733 B2
(45) Date of Patent: Jun. 19, 2018

(54) PEAKING HEADROOM FOR FLAT PANEL DISPLAYS

(71) Applicant: GVBB HOLDINGS S.A.R.L., Luxembourg (LU)

(72) Inventors: Florus Bernardus Van Den Herik, Breda (NL); Martin De Boer, Breda (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days. days.

(21) Appl. No.: 15/154,893

(22) Filed: May 13, 2016

(65) Prior Publication Data

US 2017/0332002 A1  Nov. 16, 2017

(51) Int. Cl.
*H04N 5/232* (2006.01)
*H04N 5/225* (2006.01)

(52) U.S. Cl.
CPC ....... *H04N 5/23212* (2013.01); *H04N 5/2257* (2013.01)

(58) Field of Classification Search
CPC .......................... H04N 5/23212; H04N 5/2257
See application file for complete search history.

(56) References Cited

U.S. PATENT DOCUMENTS

| 7,310,113 | B2* | 12/2007 | Yasuda | H04N 5/243 348/230.1 |
| 2004/0141082 | A1* | 7/2004 | Nakahira | H04N 5/23245 348/333.01 |
| 2008/0055435 | A1* | 3/2008 | Kawamura | H04N 5/23212 348/253 |
| 2013/0335619 | A1* | 12/2013 | Itoh | H04N 5/23212 348/349 |

FOREIGN PATENT DOCUMENTS

| DE | 4015446 A1 | 11/1991 |
| DE | 4018492.7 A1 | 12/1991 |
| WO | 9911057 A2 | 3/1999 |

* cited by examiner

*Primary Examiner* — Gevell Selby
(74) *Attorney, Agent, or Firm* — Arent Fox LLP

(57) ABSTRACT

A focus assist circuit for a viewfinder, including a video amplifier configured to amplify a video signal, a video gain controller configured to adjust gain of the video amplifier to provide peaking headroom, and a peaking processor configured to adjust the amplified video signal. The focus assist circuitry may facilitate focusing a camera lens by proving peaking headroom for a peaking signal that is combined with an amplified signal. The peaking headroom limits the gain applied to a video signal in order to reduce distortions in the peaks. A user interface may include input controls configured to limit the gain of the of a video amplifier.

18 Claims, 6 Drawing Sheets

PEAKING HEADROOM FOR FLAT PANEL DISPLAYS

BACKGROUND

Field

The present disclosure relates generally to an apparatus that assists in focusing camera viewfinders particularly, to an apparatus to reducing and limiting the video gain in the viewfinder processing to provide more contrast for focusing techniques such as aperture correction or edge enhancement.

Background

In high definition (HD) broadcast camera systems, various techniques have been developed for camera viewfinders to help camera operator focus the camera lens. For example, one technique displays a magnified portion of a scene in a viewfinder whereby the camera lens is adjusted to bring the magnified portion into sharp focus. The basis for this technique is that the larger magnified portion provides more detail in the vicinity of the region of interest from which to focus thereby facilitating focusing. Another technique particularly useful for automatic focusing implements specific video processing to enhance contours in a viewfinder to obtain stressed contours when the viewfinder signal is correctly focused.

The majority of these techniques have been developed for cathode ray tube (CRT) viewfinders that may accommodate peaking signals well above 100% of operating luminosity. As such, these techniques are less effective and may be inadequate for more modern technologies such as liquid crystal displays (LCD) and organic light emitting diodes (OLEDs).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a focus assist circuit for a camera viewfinder, comprising: a video amplifier configured to amplify a video signal; a video gain controller configured to adjust gain of the video amplifier to provide peaking headroom; and a peaking processor configured to adjust the amplified video signal.

In an aspect of the disclosure, a method of providing peaking headroom for a camera viewfinder, comprising: amplifying a video signal including adjusting gain of the video signal to provide peaking headroom; and adjusting the amplified video signal.

In an aspect of the disclosure, an apparatus for providing peaking headroom for a camera viewfinder, comprising: amplifying means for amplifying a video signal; means for adjusting gain of the amplifying means to provide peaking headroom; and means for adjusting the amplified video signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Additional advantages and novel features of these aspects will be set forth in part in the description that follows, and in part will become more apparent to those skilled in the art upon examination of the following or upon learning by practice of the invention.

BRIEF DESCRIPTION OF THE DRAWINGS

For a better understanding of the various described aspects, reference should be made to the description below, in conjunction with the following figures in which like reference numerals refer to corresponding parts throughout the figures.

DETAILED DESCRIPTION

Figure 1A:
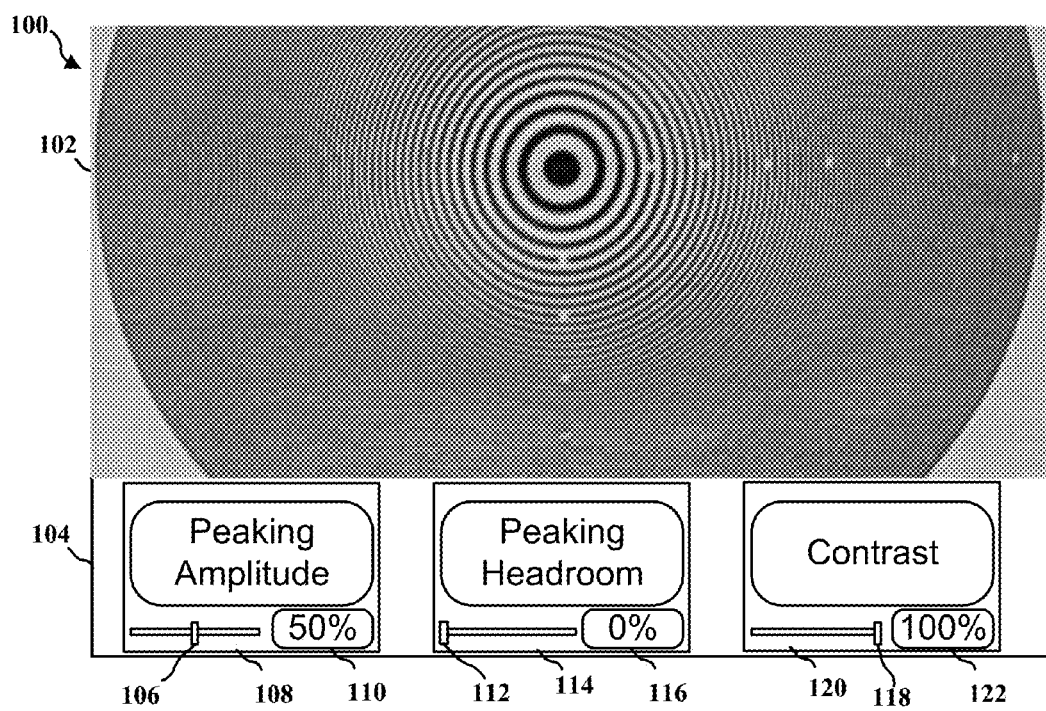
FIG. 1A illustrates an example of a LCD viewfinder with peaking headroom disabled in the camera focus assist circuitry.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of video production systems will now be presented with reference to various apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

One property of CRT based viewfinders is that they do not distort peaking signals that exceed a 100% luminance of non-peaking signals. As such, CRT viewfinders set at a 100% luminance may illuminate peaking signals with a high luminance than 100%. This means that peaking signals may illuminate brighter than non-peaking signal even when peaking signals are pegged at 100% luminance. Focus assist video processing circuitry (e.g., peaking, contour, sharpness, or aperture) make use of this property in CRT based viewfinders to assist in focusing a lens.

By comparison, the light emitting mechanisms differ between CRT viewfinders and flat panel displays (FPD) viewfinders. CRT viewfinders are configured to convert an analog video signal into an electron beam that bombards a phosphorescent screen with electrons to produce images. Whereas LCD viewfinders, for example, do not emit light directly and instead rely on a backlight or a reflector to emit images through a liquid crystal. As such, the peaking signals and non-peaking signals of LCD viewfinders may not exceed the maximum luminance of the backlight (e.g., 100% luminance). This means that signals that exceed 100% luminance may be clipped and indistinguishable from other peaking signals that also exceed 100% luminance. This inability to distinguish particular signals makes focusing difficult.

In addition, the video signal differs between CRT viewfinders and FPD viewfinders. The video signal applied to the CRT is analog and can be overdriven (e.g., luminance greater than 100%) for some time without immediately destroying or wearing out the phosphor. This is a property carefully utilized in CRT viewfinders to distinguish peaking signals that exceed 100% luminance. In contrast, the signal applied to FPDs is digital and cannot overdrive beyond a maximum value (e.g., FFh). For example, applying a digital signal FFh (e.g., 100% luminance) for R, G and B results in a maximum white screen and any signal (e.g., peaking signal) in excess of FFh is interpreted a maximum white screen with a value of FFh.

Recent improvements in flat panel display technologies have made flat panel viewfinders much more appealing than CRTs. For one, flat panel viewfinders may provide much higher resolution than CRT viewfinders. For another, flat panel viewfinders (e.g., light emitting diode, and OLEDs) tend to have a higher light output with significantly lower power draw than CRTs. Despite the these benefits, flat panel viewfinders are still susceptible to signal distortions such as clipping. As such, focusing flat panel viewfinders is challenging compared to their CRT counterparts.

One technique to assist in focusing and preventing signal distortion (e.g., clipping) in an output video signal is to implement peaking headroom in focusing assist apparatus circuitry, which restricts the output luminosity to provide headroom in the viewfinders luminance for peaking signals.

FIG. 1A illustrates an example of a viewfinder with peaking headroom disabled in the camera focus assist circuitry. The viewfinder 100 displays the viewing region 102 that shows the image captured by the camera sensors (e.g., CMOS sensor, CCD sensor) and the graphical user interface (GUI) 104. As depicted, viewing region 102 captures an image of a circular disc with concentric interference patterns. The viewfinder 100 may be a touch screen with GUI controls (e.g., peaking amplitude, peaking headroom, contrast) that may be touch activated by a finger, stylus and the like. The GUI 104 may include user interface elements such as input controls, navigation components, information components, and containers. As input controls, GUI 104 includes peaking amplitude control 108, peaking headroom control 114, and contrast control 120. Further, input controls include peaking amplitude slider 106, peaking headroom slider 112, and contrast slider 118 for adjusting the input control. Conceivably, other input controls for GUI 104 may be buttons (e.g., radio buttons, dropdown buttons), selectors (e.g., dropdown lists, checkboxes, list boxes, date and time pickers, etc.), sliders, toggles, and the like. The input controls may also include indicators such as peaking amplitude indicator 110, peaking headroom indicator 116, and contrast indicator 122.

It should be appreciated that aspects of viewfinder 100 and camera focus assist circuitry are not limited to GUI interface. For instance, in some embodiments, viewfinder 100 may be a screen that includes buttons, switches, and other electrical devices (e.g., mouse, trackball) to navigate various menus, input controls, navigation components, information components, and containers. As such, a user interface may include scrolling to various menus displayed on LCD viewfinder using a scroll switch and selecting various menus may be actuated depressing a button.

In reference to the example of FIG. 1A, peaking headroom slider 112 is positioned to disable the peaking headroom circuitry as displayed in peaking headroom indicator 116 of 0%. Consequently, peaking signals of the captured image may be distorted (e.g., clipped) and indistinguishable from non-peaking images displayed in the viewing region 102 of viewfinder 100. As depicted, the signal peaks from the edge regions of the concentric interference patterns blend in with the background of the circular disc pattern image.

Figure 1B:
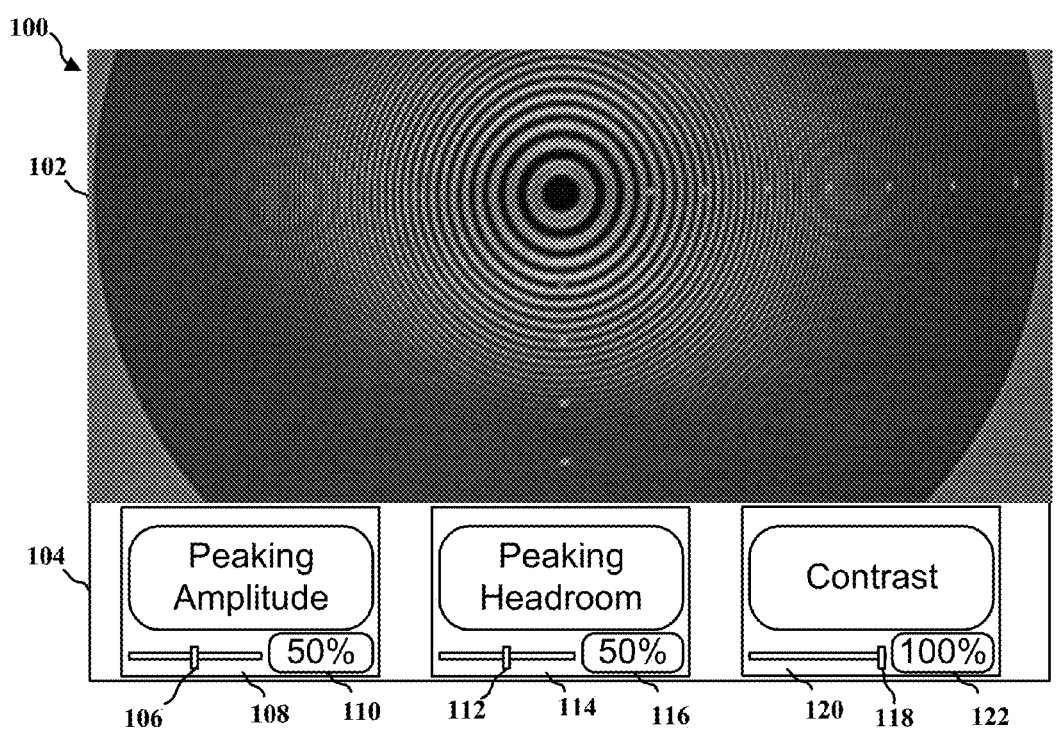
FIG. 1B illustrates an example of a LCD viewfinder with peaking headroom enabled in the camera focus assist circuitry.

FIG. 1B illustrates an example of a LCD viewfinder with peaking headroom enabled in the camera focus assist circuitry. In this example, peaking headroom slider 112 is positioned to 50% peaking headroom as displayed on peaking headroom indicator 116. This results in less peaking signals of the captured image being clipped, which provides for more distinguishable peaking signals displayed in the viewing region 102 of viewfinder 100. As depicted, the additional headroom of 50% provides the peaking signals to illuminate without distortion. The signal peaks emphasize the edge regions of the concentric interference patterns in the center region of the captured image alongside the non-peaking signals in the periphery that are darker. By comparison with FIG. 1A, the video image of FIG. 1B provides more distinguishable features at the edges (e.g., crisp image), which facilitates focusing the camera lens.

In some embodiments, a color may overlay the peaking regions to highlight the peaking region. For example, a fluorescent green or fluorescent yellow may be applied to the region of FIG. 1A that corresponds to peaking region. This provides a visible distinguishing feature on the display. In some cases, a fluorescent green or fluorescent yellow may overlay the peaking regions that are being clipped by viewfinder 100.

Figure 2:
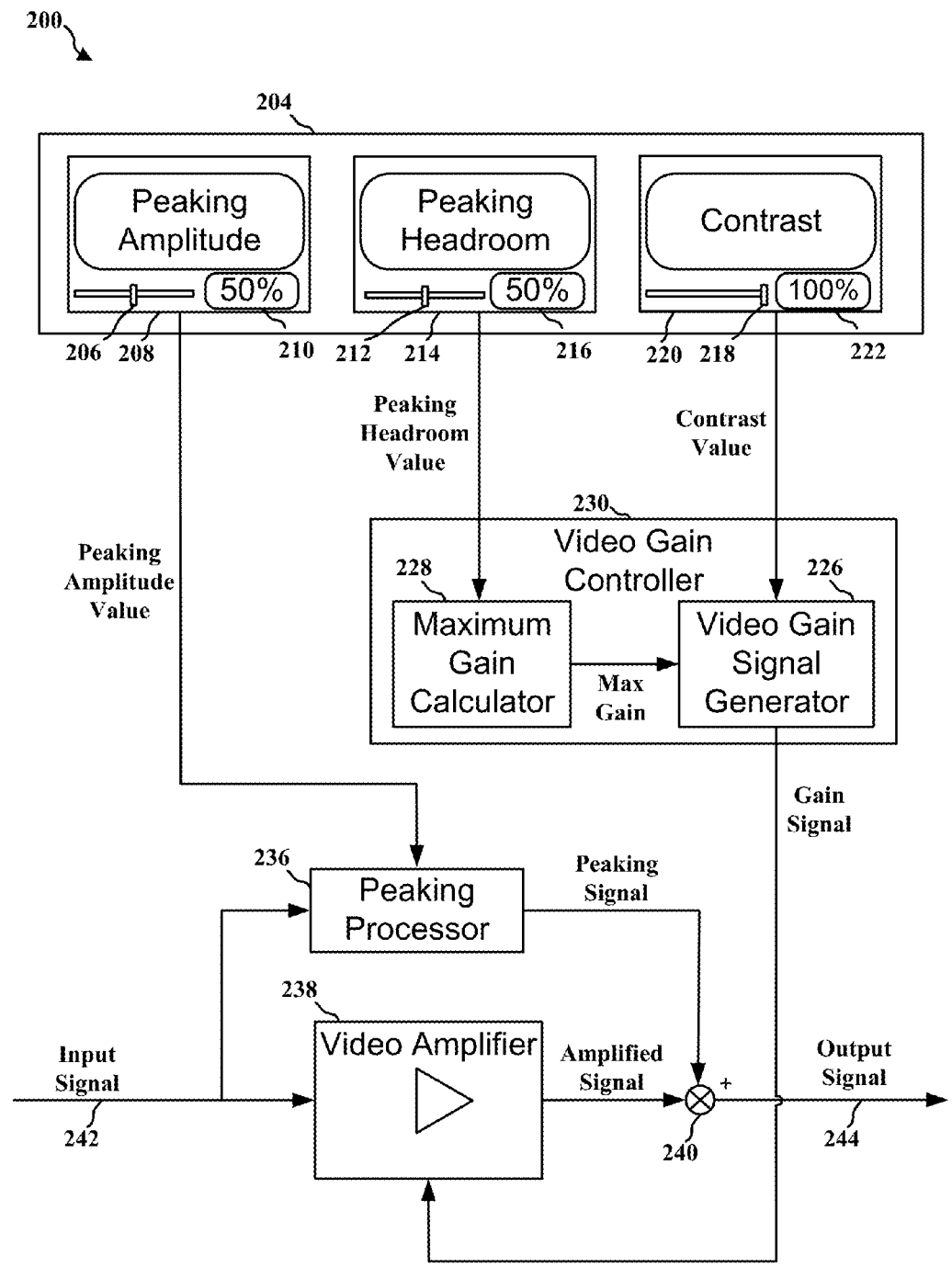
FIG. 2 is a diagram illustrating an example of the connectivity between GUI, software modules, and hardware components of a camera focus assist circuitry.

FIG. 2 is a diagram illustrating an example of the connectivity between GUI, software modules, and hardware components of a camera focus assist circuitry. As depicted, GUI 204 includes peaking amplitude control 208, a peaking amplitude slider 206, a peaking amplitude indicator 210, peaking headroom control 214, a peaking headroom slider 212, a peaking headroom indicator 215, and contrast control 220, a contrast slider 218, and a contrast indicator 222.

As depicted, peaking amplitude control 208 receives user input and provides a selected peaking amplitude value to peaking processor 236. Peaking amplitude control 208 may be the means for controlling peaking amplitude. For example, a user may adjust peaking amplitude slider 206 to select a peaking amplitude value of 50% to be applied to peaking processor 236. In some embodiments, peaking processor 236 is a software module that output a peaking signal from the video input 242.

Peaking headroom control 214 may receive input from a user and provide a selected peaking headroom value to maximum gain calculator 228. The peaking headroom control 214 provides means for controlling peaking headroom. That is, a user may adjust peaking headroom slider 212 to select a peaking headroom value of 50% to be provided to maximum gain calculator 228. In turn, maximum gain calculator 228 may calculate the maximum gain that video gain signal generator 226 may apply based on the peaking headroom value. For example, in some instances a circuit may only support a maximum gain (e.g., 10 out of 10) before distortions (e.g., clipping) occurs in a LCD viewfinder. In such an example, maximum gain calculator 228 may determine that maximum gain (e.g., 5 out of 10) may be applied for a peaking headroom value of 50%.

Video gain controller 230 may include video gain signal generator 226 and maximum gain calculator 228. The video gain signal generator 226 may be a hardware or software module with means for limiting the video gain signal such as limiting a range for the video gain signal. In addition, the video gain signal generator 226 may limit the gain range based on the maximum gain determined by maximum gain calculator 228. For example, maximum gain calculator 228 may set the maximum gain value (e.g., gain of 5 out of 10 for peaking headroom of 50%) for video gain signal generator 226. In such an example, video gain signal generator 226 may not exceed gain of 50% (e.g., gain of 5 out of 10), which corresponds to contrast of 100% (e.g., full contrast).

Maximum gain calculator 228 may be a hardware of software module such as a programmable firmware encoded on a programmable electronic device. In some embodiments, for example, maximum gain calculator 228 is a hardware module configured to receive a peaking heading value from peaking headroom control 214 and provide a maximum gain setting for video gain signal generator 226. Peaking headroom slider 212 may adjust the gain for maximum gain calculator 228, which may be circuitry (e.g., resistance limiter, current limiter, voltage limiter) configured to limit the maximum gain that video gain controller 230 may apply to video amplifier 238.

Contrast control 220 may receive input from a user and provides a selected contrast value to video gain signal generator 226. In particular, a user may adjust the position of contrast slider 218 to select a contrast value of 100% to be provided to video gain signal generator 226. As depicted in FIG. 2, for example, contrast slider 218 may set a contrast to 100% for video gain signal generator 226, which adjusts the gain signal to half the maximum gain value provided by maximum gain calculator 228 (e.g., based on maximum gain calculator 228 set at 50%).

As depicted in FIG. 2, video gain controller 230 may include maximum gain calculator 228 that provides a maximum gain value to video gain signal generator 226. In particular, peaking headroom control 214 may provide peaking headroom value to maximum gain calculator 228, which in turn determines the maximum gain based on the peaking headroom value and maximum the luminance of the viewfinder. For example, a peaking headroom value of 50% provides a maximum gain value of half the maximum the luminance of the viewfinder to video gain signal generator 226.

Further, the video gain controller 230 and/or the video gain signal generator 226 may provide the means for adjusting gain of the amplifying means to provide peaking headroom. That is, for example, a user may adjust the peaking headroom slider 212, which causes maximum gain calculator 228 to change the maximum gain value. Further, the video gain signal generator 226 adjusts the gain signal based on the maximum gain value. In some embodiments, the video gain controller 230 may be the means for limiting the video gain signal and may be configured to use maximum gain calculator 228 to limit the video gain signal based on the peaking headroom control 214. It should be appreciated that adjusting the contrast slider 218 may also causes the video gain signal generator 226 to adjust the gain signal.

In some embodiments, video gain controller 230 is a software module. For example, video gain controller 230 is set of instructions encoded on programmable firmware of an electronic device. In other embodiments, video gain controller 230 is a hardware module configured to receive a contrast value from contrast control 220 and provide a maximum gain setting for video gain controller 230. In some embodiments, video gain controller 230 is the means for adjusting gain and may include video gain signal generator 226 as the means for generating a video gain signal. Further, the video gain signal generator 226 may use the video gain signal for adjusting the gain of the means based on user input from contrast control 220.

Peaking processor 236 may receive input from video input 242 and peaking amplitude value from peaking amplitude control 208 and outputs a peaking signal to signal combiner 240. In some embodiments, peaking processor 236 is a high-pass filter configured to filter out low frequency signals from the input video signal to signal combiner 240 for combination with an amplified input signal from video amplifier 238. In some embodiments, peaking processor 236 is a transversal filter configured to increase the steepness of amplitude transitions of video signals. In such a transversal filter, a desired amplitude or phase characteristic (or both) as a function of frequency may be formed substantially without introducing phase non-linearity or phase distortion. Peaking amplitude control 208 may input a peaking amplitude value in peaking processor 236 to adjust the filter based on user input control from peaking amplitude control 208.

Video amplifier 238 may receive input from video input 242 and video gain controller 230 and outputs an amplified signal to signal combiner 240. That is, video amplifier 238 may provide the amplification means for amplifying a video signal. In some embodiments, video amplifier 238 is configured to amplify a video signal from video input 242 based on a gain value from video gain signal generator 226 of video gain controller 230. In some cases, the video gain signal generator 226 may adjust the video gain applied to video amplifier 238 based on user inputs from peaking headroom control 214 and contrast control 220. The amplified output video signal of video amplifier 238 feeds into signal combiner 240.

Signal combiner 240 may receive input from peaking processor 236 and video amplifier 238. Signal combiner 240 may be a module or circuit that is configured to with the means for adjusting the amplified video signal. That is, signal combiner 240 is the means for combining the amplified video signal with a peaking processing signal. In some embodiments, signal combiner 240 is configured to receive the amplified video signal from video amplifier 238. In turn, signal combiner 240 outputs a superposition of the video signal from peaking processor 236 and video amplifier 238.

It should be appreciated that the configuration to combine a video peaking signal and an amplified video signal is not limited to a viewfinder. For example, peaking processing may be implemented in a camera. In addition, it should be appreciated that the mechanisms to implement peaking headroom may vary.

In another approach, peaking headroom may be applied by reducing and limiting the video gain in the viewfinder processing. That is, in an 8 bit viewfinder display system the 256 luminance levels may be compressed to 128 luminance levels by the video gain controller 230. As such, the remaining levels may be reserved as headroom for the peaking signals that are added to the video signal after contrast control 220.

1. Unfocused Video Signal

In this example, a camera captures an unfocused video image signal of horizontal square-wave pattern (e.g., steep transition edges). The video signal is unfocused on the square-wave patter, which causes the transition edges blend together and produce a blurred pattern without sharp definitive edge transitions.

Figure 3:
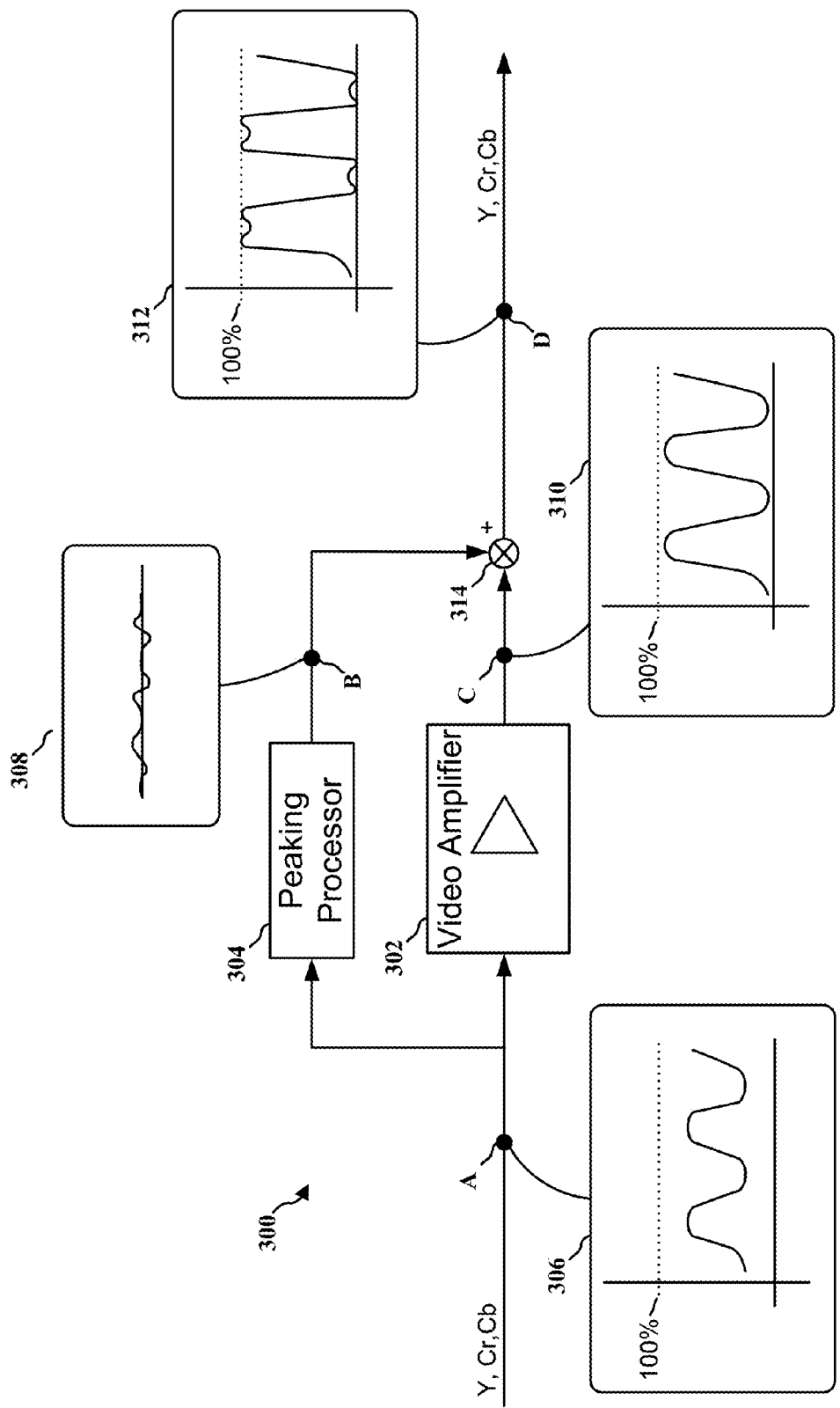
FIG. 3 is a diagram illustrating an example of unfocused video signals at various nodes within the processing components of a camera focus assist circuitry.

FIG. 3 is a diagram illustrating an example of a unfocused video signal at various nodes within the processing components 300 of a camera focus assist circuitry. In this instance, contrast slider 218 is set to 100% and the peaking headroom slider 212 is set to 0%. Consequently, the amplitude of the video signal is 100% as depicted in signal block 310 at node C of FIG. 3. Because the image is unfocused, the transition edges of the square-wave pattern blend together and produce a pattern as illustrated at node A in signal block 306. This reduction in edge transitions broadens the transition edges, which provides less high frequency components (e.g., Fourier series).

Peaking processor 304 may receive the unfocused video image signal and provide the peaking signal to signal combiner 314. In particular, peaking processor 304 filters out the low frequency components to provide the peaking signal (e.g., high frequency components) to signal combiner 314. Signal block 308 of the video signal at node B depicts the video signal after peaking processor filters the input signal to the peaking signal. The peaks of peaking signal have lower amplitude because the blurred image does not provide as many high frequency components as a focused video signal.

Video amplifier 302 may amplify the unfocused video image signal and provide the amplified signal to signal combiner 314. Signal block 310 of the video signal at node C depicts the amplified video signal after video amplifier 302 amplifies the input signal. As such, the video signal of signal block 310 has been amplified from the video signal of signal block 306.

Signal combiner 314 combines the peaking signal from peaking processor 304 with the amplified signal from video amplifier 302. As depicted in signal block 312 at node D, the peaks of the peaking signal add to the amplified signal. In this instance, the broadening effect of the video signal caused by the lens being unfocused does not produce high amplitude peaks in the output video signal. As depicted, the broadened peaking signal do not exceed 100% luminance and therefore does not distort (e.g., clip) the output video signal.

2. Focused Video Signal with Peaking Headroom Disabled

In this example, a camera captures a focused video image signal of horizontal square-wave pattern (e.g., steep transition edges). The camera includes focus assist circuitry, however, the peaking headroom is disabled (e.g., 0% peaking headroom) similar to the settings depicted in viewfinder 100 of FIG. 1A. The video signal is focused on the square-wave pattern as indicated by sharp definitive transition edge transitions.

Figure 4:
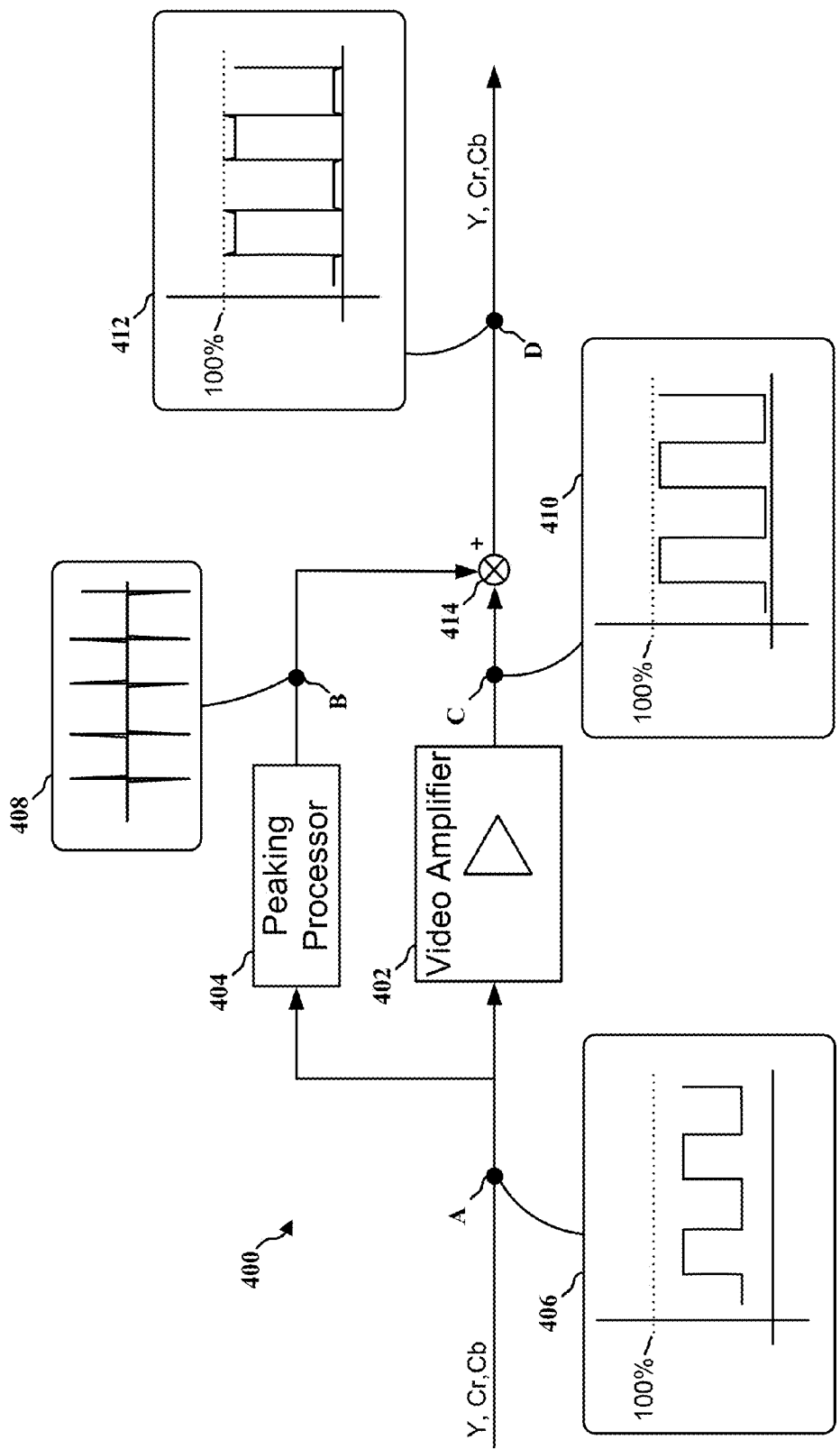
FIG. 4 is a diagram illustrating an example of signals at various nodes within the hardware components of a camera focus assist circuitry with peaking head room disabled for a focused video signal.

FIG. 4 is a diagram illustrating an example of signals at various nodes within the hardware components of a camera focus assist circuitry with peaking headroom disabled for a focused video signal. In this instance, contrast slider 218 is set to 100% and the peaking headroom slider 212 is set to 0%. Consequently, the amplitude of the video signal is 100% as depicted in signal block 410 at node C of FIG. 4. Because the video signal is focused the transition edges of the square-wave pattern are steep (e.g., sharp) and produce a pattern as illustrated at node A in signal block 406. The steep transition edges include more high frequency components (e.g., Fourier series) than the unfocused video signal (FIG. 3 at signal block 306).

Peaking processor 404 may receive the focused video image signal and provides the peaking signal to signal combiner 414. Peaking processor 404 filters out the low frequency components to provide the peaking signal (e.g., high frequency components) to signal combiner 414. Signal block 408 at node B depicts the video signal after peaking processor filters the input signal to the peaking signal. In this instance, the peaks of peaking signal are spikes with high amplitude that correspond to the high frequency components of the edge transitions.

Video amplifier 402 may amplify the focused video image signal and provide the amplified signal to signal combiner 414. Signal block 410 at node C depicts the amplified video signal after video amplifier 402 amplifies the input signal. As such, the video signal of signal block 410 has been amplified from the video signal of signal block 406.

Signal combiner 414 is configured to combine the peaking signal from peaking processor 404 with the amplified signal from video amplifier 402. As depicted in signal block 412 at node D, the peaks of the peaking signal of node B add to the amplified signal of node C. In this instance, the spikes in the peaking signal produce high amplitude peaks in the output video signal and peaks that exceed 100% luminance and are clipped, which distorts (e.g., clips) output video signal for the viewfinder. This means that the distorted video signal peaks (e.g., clipped peaks) may become indistinguishable from non-peaks of the video signal as the viewfinder processes and renders the video signal into viewable pixels as illustrated in viewfinder 100 of FIG. 1A.

3. Focused Video Signal with Peaking Headroom Enabled

In this example, a camera captures a focused video image signal of horizontal square-wave pattern (e.g., steep transition edges). The camera includes focus assist circuitry with the peaking headroom set to 50% similar to the settings depicted in viewfinder 100 of FIG. 1B. The video signal is focused on the square-wave pattern as indicated by sharp definitive transition edge transitions.

Figure 5:
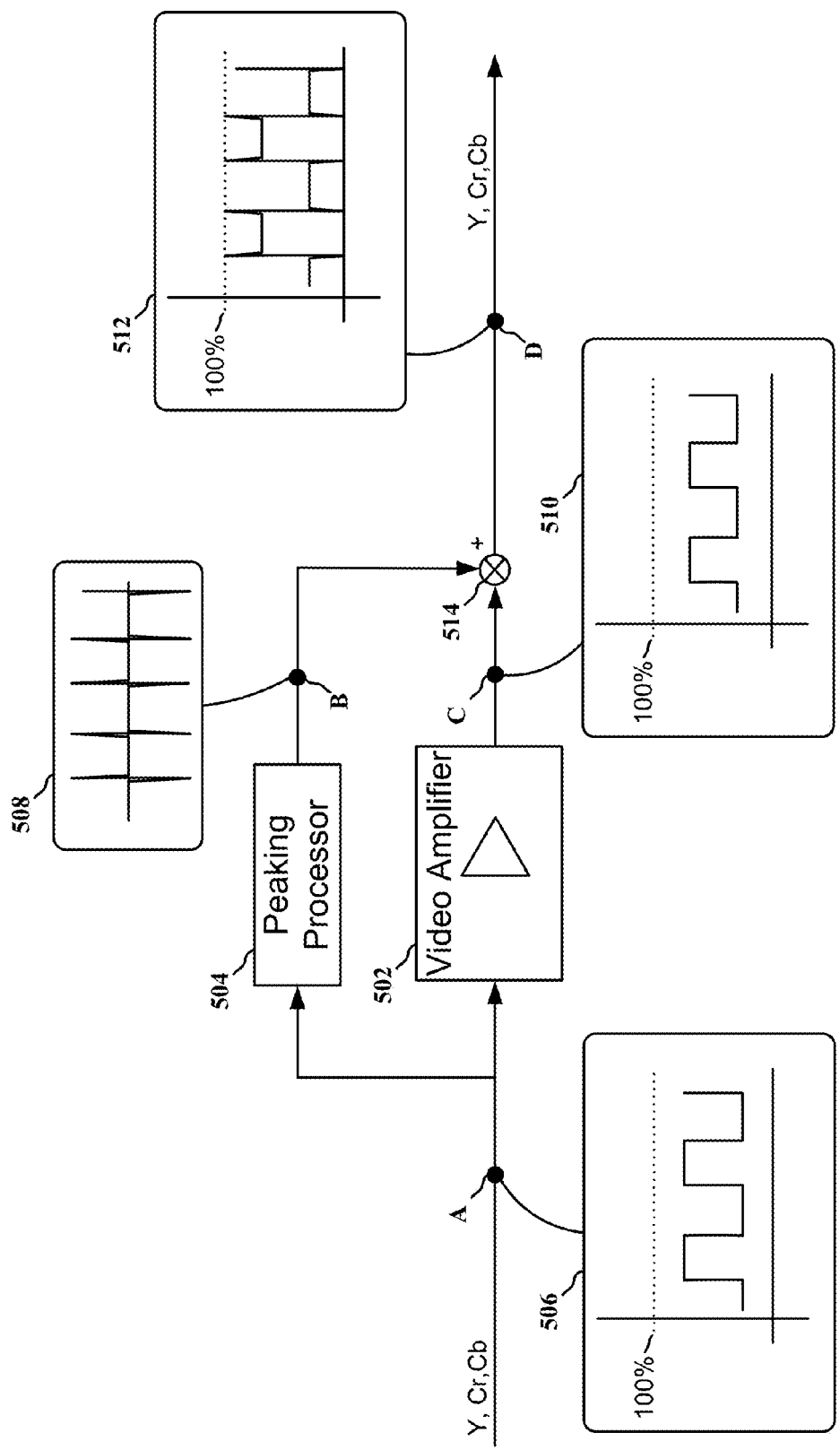
FIG. 5 is a diagram illustrating an example of signals at various nodes within the hardware components of a camera focus assist apparatus 100 with peaking head room set to 50% for a focused video signal.

FIG. 5 is a diagram illustrating an example of signals at various nodes within the hardware components of a camera focus assist circuitry with peaking head room set to 50% for a focused video signal. In this instance, the focused video signal causes the transition edges of the square-wave pattern to be steep (e.g., sharp) and produce a pattern as illustrated at node A in signal block 506. The steep transition edges include more high frequency components (e.g., Fourier series) than the unfocused video signal (FIG. 3 at signal block 306).

Peaking processor 504 may receive the focused video image signal and may provide the peaking signal to signal combiner 514. In particular, peaking processor 504 filters out the low frequency components to provide the peaking signal (e.g., high frequency components) to signal combiner 514. Signal block 508 at node B depicts the video signal after peaking processor filters the input signal to the peaking signal. In this instance, the peaks of peaking signal are spikes with a high amplitude that correspond to the high frequency components of the edge transitions.

Video amplifier 502 may amplify the focused video image signal and provide the amplified signal to signal combiner 514. In this instance peaking headroom has been enabled and set to 50%, which limits the gain applied to video amplifier 502. Signal block 510 at node C depicts the amplified video signal after video amplifier 502 amplifies the input signal with the gain limited to provide 50% headroom for peaks. As such, the video signal of signal block 510 has been amplified from the video signal of signal block 506. By comparison with signal block 410 of FIG. 4, the amplitude of the video signal depicted in signal block 510 has been restricted to provide 50% peaking headroom.

Signal combiner 514 is configured to combine the peaking signal from peaking processor 504 with the amplified signal from video amplifier 502. As depicted in signal block 512 at node D, the peaks of the peaking signal of node B add to the amplified signal of node C. In this instance, the spikes in the peaking signal produce high amplitude peaks in the output video signal and peaks that may exceed 100% luminance. However, the 50% more headroom has been provide to reduce signal distortions in output video signal. Providing 50% more peaking headroom as depicted in signal block 512 results in less distortion (e.g., clipping) the output video signal than the output video signal depicted in signal block 412 of peaking headroom disabled (FIG. 4). As such, output video signal of signal block 512 at node D provides more distinguishable signal peaks than output video signal of signal block 412 at node D (FIG. 4). The distinction between output video signal of signal block 512 at node D and the output video signal of signal block 412 at node D (FIG. 4) is clearly distinguishable by comparing the viewing region 102 with 50% peaking headroom (FIG. 1B) to the viewing region 102 with 0% peaking headroom (FIG. 1A).

Figure 6:
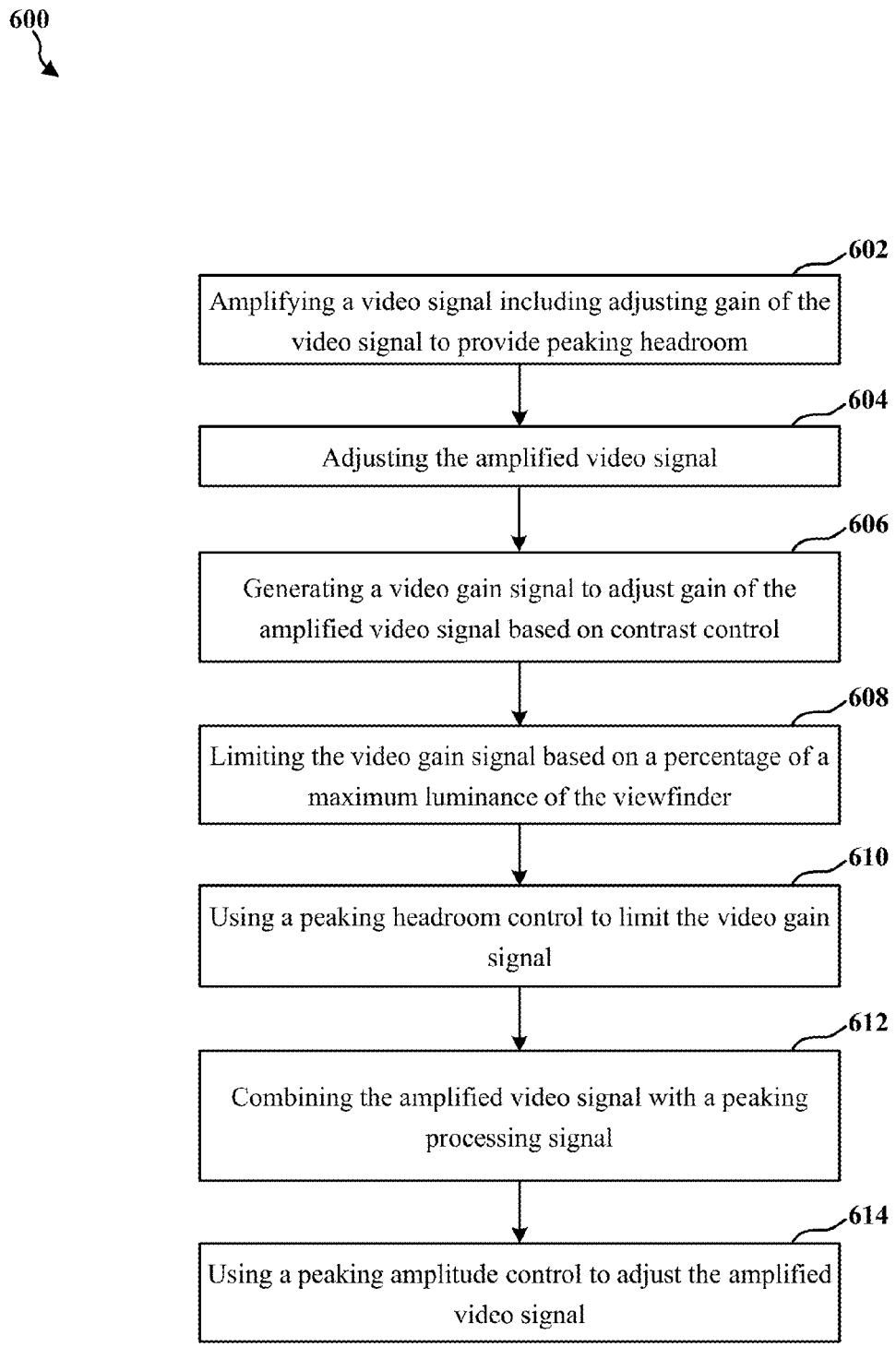
FIG. 6 is a flowchart of a method of providing peaking headroom for a camera viewfinder.

FIG. 6 is a flowchart of a method of providing peaking headroom for a viewfinder 100. The viewfinder 100 may be a flat panel viewfinder such as an LCD, LED, OLED, and the like. The viewfinder 100 may include focus assist circuitry configured to provide headroom for peaking signals.

In one embodiment, at block 602, the focus assist circuitry may include circuitry configured to amplify a video signal including adjusting gain of the video signal to provide peaking headroom. In particular, the focus assists circuitry may include video amplifier 238, 302, 402, 502 configured to amplify an input video signal from a camera or other video media device. Further, the circuitry may limit the gain of video amplifier 238, 302, 402, 502 to provide headroom for peaking signals. For example, video gain controller 230 may be configured to limit the gain that video amplifier 238, 302, 402, 502 applies to the amplified signal. In some instances, video gain controller 230 may determine the gain based on user input controls (e.g., peaking headroom control 214 and contrast control 220).

In one embodiment, at block 604, the focus assist circuitry may include circuitry configured to adjust the amplified video signal. For example, the focus assist circuitry may include signal combiner 240 that is configured to combine an amplified video signal with a peaking signal. In some instances, peaking processor 236, 304, 404, 504 may be a high-pass filter configured to filter out low frequency signals from the input video signal for combination with an amplified input signal from video amplifier 238, 302, 402, 502. In such instances, peaking processor 236, 304, 404, 504 combines high frequency peaking components of the input signal with an amplified video signal.

In one embodiment, at block 606, the video gain controller 230 configured to adjust gain of the video signal may include circuitry to generate a video gain signal for adjusting the gain of the video signal based on contrast control. As discussed above with respect to FIG. 2, video gain controller 230 may be configured to generate a video gain signal to video amplifier 238 based on user input from contrast control. For example, a user may set contrast to 50% in contrast control 220 and in turn, video gain controller 230 may generate a gain signal for half the gain range (e.g., 50% of max gain determined by maximum gain calculator 228). In some embodiments, video gain controller 230 may include video gain signal generator 226 that is configured to generate a gain signal for video amplifier 238, 302, 402, 502 based on a contrast value from contrast control 220.

In one embodiment, at block 608, the video gain controller 230 configured to adjust gain of the video signal may include circuitry to adjust gain of the video signal. In some instances, this may include limiting the video gain signal based on a percentage of a maximum luminance of the viewfinder. For example, the focus assist circuitry may be designed for a specific flat panel viewfinder (e.g., LCD, LED, OLED). As such, the focus assist circuitry may implement the maximum luminance of the viewfinder as a parameter for the circuit design. To provide built in headroom for the circuit design a percentage of a maximum luminance of the viewfinder may be set. Further, video gain controller 230 may be configured to dynamically limit the generated video gain signal based on a percentage of a maximum luminance of the viewfinder and on control inputs from a user (e.g., peaking headroom control, contrast control).

In some instances, maximum gain calculator 228 may take in to account maximum luminance of the viewfinder when providing the video gain signal generator the maximum gain value. Further, in some instances, the video gain signal may be based on a percentage of a maximum luminance of the viewfinder In one embodiment, at block 610, the video gain controller 230 configured to adjust gain of the video signal may include circuitry to use a peaking headroom control to limit the video gain signal. For example, the video gain controller 230 may be configured to limit the generated video gain signal based on peaking headroom control 214 (e.g., peaking headroom slider 212) of the user interface. In reference to FIG. 2, in some instances, peaking headroom control 214 may provide a peaking headroom value to maximum gain calculator 228 in order to determine the maximum gain and limit the generated video gain signal independent of contrast.

In one embodiment, at block 612, the signal combiner 240 configured to adjust gain of the video signal may include circuitry to combine the amplified video signal with a peaking processing signal. For example, the focus assist circuitry may include signal combiner 240, 314, 414, 514 to superimpose a pealing signal from peaking processor 236, 304, 404, 504 and an amplified input signal from video amplifier 238, 302, 402, 502. In some instances, the peaking processor 236, 304, 404, 504 may adjust the peaking signal in response to changes in a peaking control signal. The adjustments by a user at peaking amplitude control 208, for example, may initiate changes in the peaking control signal.

In one embodiment, at block 614, the focus assist circuitry may use a peaking amplitude control circuit or module to adjust the amplified video signal. For example, as discussed above with respect to FIG. 2, peaking amplitude control 208 may be configured to provide a peaking amplitude value to peaking processor 236 in order to adjust the output peaking signal.

By way of example and without limitation, the aspects of the present disclosure are presented with reference to systems and methods used to configure various components of a media production system that may be used for production of television programming or at sports events. The various concepts presented throughout this disclosure may be implemented across a broad variety of media production/advertisement systems.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C. § 112(f) unless the element is expressly recited using the phrase "means for."

What is claimed is:

1. A focus assist circuit for a camera viewfinder comprising:
    a video amplifier configured to amplify a video signal;
    a video gain controller configured to adjust a gain of the video amplifier to provide peaking headroom; and
    a peaking processor configured to adjust the amplified video signal,
    wherein the video gain controller comprises a video gain signal generator configured to generate a video gain signal for adjusting the gain of the video amplifier based on contrast control.

2. The circuit of claim 1, wherein the video gain controller further comprises a video gain limiter configured to limit the video gain signal based on a percentage of a maximum luminance of the camera viewfinder.

3. The circuit of claim 2, further comprising a user interface having a peaking headroom control, and wherein the video gain limiter is further configured to limit the video gain signal based on the peaking headroom control.

4. The circuit of claim 1, further comprising a signal combiner configured to receive the amplified video signal from the video amplifier, and wherein the peaking processor is further configured to adjust the amplified video signal through the signal combiner.

5. The circuit of claim 1, further comprising a user interface having a peaking amplitude control, and wherein the peaking processor is further configured to adjust the amplified video signal from the video amplifier based on the peaking amplitude control.

6. The focus assist circuit of claim 1, wherein the adjusted and amplified video signal is output to be displayed on a flat panel display of the camera viewfinder without distortion.

7. A method of providing peaking headroom for a camera viewfinder, the method comprising:
amplifying a video signal;
adjusting a gain of the video signal to provide peaking headroom; and
adjusting the amplified video signal,
wherein the adjusting gain of the video signal comprises generating a video gain signal for adjusting the gain of the video signal based on a contrast control.

8. The method of claim 7, wherein the adjusting of the gain of the video signal further comprises limiting the video gain signal based on a percentage of a maximum luminance of the camera viewfinder.

9. The method of claim 8, wherein the adjusting gain of the video signal further comprises using a peaking headroom control to limit the video gain signal.

10. The method of claim 7, wherein the adjusting of the amplified video signal comprises combining the amplified video signal with a peaking processing signal.

11. The method of claim 7, wherein the adjusting of the amplified video signal comprises using a peaking amplitude control to adjust the amplified video signal.

12. The method of claim 7, further comprising displaying the adjusted and amplified video signal on a flat panel display of the camera viewfinder without distortion.

13. An apparatus for providing peaking headroom for a camera viewfinder, the apparatus comprising:
amplifying means for amplifying a video signal;
means for adjusting a gain of the amplifying means to provide peaking headroom; and
means for adjusting the amplified video signal,
wherein the means for adjusting the gain comprises means for generating a video gain signal for adjusting the gain based on a contrast control.

14. The apparatus of claim 13, wherein the means for adjusting the gain comprises means for limiting the video gain signal based on a percentage of a maximum luminance of the camera viewfinder.

15. The apparatus of claim 14, further comprising means for controlling peaking headroom using a peaking headroom control, wherein the means for limiting the video gain signal is configured to limit the video gain signal based on the peaking headroom control.

16. The apparatus of claim 13, wherein the means for adjusting the amplified video signal comprises means for combining the amplified video signal with a peaking processing signal.

17. The apparatus of claim 13, wherein the means for adjusting the amplified video signal comprises means for controlling peaking amplitude using a peaking amplitude control.

18. The apparatus of claim 13, further comprising means for displaying the adjusted and amplified video signal on a flat panel display of the camera viewfinder without distortion.

* * * * *